(12) United States Patent  
Naruse

(10) Patent No.: US 7,961,426 B2
(45) Date of Patent: Jun. 14, 2011

(54) DISK DEVICE

(75) Inventor: Hitoshi Naruse, Musashino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 819 days.

(21) Appl. No.: 11/905,805

(22) Filed: Oct. 4, 2007

(65) Prior Publication Data

US 2008/0086739 A1    Apr. 10, 2008

(30) Foreign Application Priority Data

Oct. 5, 2006   (JP) ................................ 2006-274282

(51) Int. Cl.
    *G11B 33/14*    (2006.01)
(52) U.S. Cl. .................................... 360/97.02
(58) Field of Classification Search ............... 360/97.02, 360/97.03, 97.04
    See application file for complete search history.

(56) References Cited

U.S. PATENT DOCUMENTS

| | | | | |
|---|---|---|---|---|
| 5,598,306 A | * | 1/1997 | Frees et al. ................. | 360/97.02 |
| 6,891,696 B1 | * | 5/2005 | Ou-Yang et al. ........... | 360/97.02 |
| 6,922,308 B1 | * | 7/2005 | Butler ........................ | 360/97.02 |
| 7,009,808 B2 | * | 3/2006 | Kovinskaya et al. ...... | 360/97.02 |
| 7,133,248 B2 | * | 11/2006 | Shin et al. .................. | 360/97.01 |
| 7,149,053 B2 | * | 12/2006 | Tadepalli et al. .......... | 360/97.02 |
| 7,355,811 B1 | * | 4/2008 | Gifford et al. ............. | 360/97.02 |
| 7,535,671 B2 | * | 5/2009 | Suzuki et al. .............. | 360/97.02 |
| 7,573,671 B2 | * | 8/2009 | Serizawa et al. ........... | 360/97.02 |
| 2001/0012174 A1 | | 8/2001 | Imamura | |

FOREIGN PATENT DOCUMENTS

| | | |
|---|---|---|
| JP | 2000-149493 | 5/2000 |
| JP | 2001-126445 | 5/2001 |
| JP | 2006-19012 | 1/2006 |
| JP | 2006-179148 | 7/2006 |

OTHER PUBLICATIONS

Japanese Office Action dated Jan. 13, 2009 for Appln. No. 2006-274282.

* cited by examiner

*Primary Examiner* — Angel A. Castro
(74) *Attorney, Agent, or Firm* — Pillsbury Winthrop Shaw Pittman, LLP

(57) ABSTRACT

According to one embodiment, a disk device includes a base having a bottom wall, a motor provided on the base, a disk rotatably supported on the motor, a head, and a head actuator which supports the head for movement with respect to the recording medium. The bottom wall of the base includes a recess opposing a movement region for the head actuator and a first step portion and a second step portion which individually extend from the vicinities of the motor to the vicinities of an outer peripheral edge of the recording medium and define the recess. At least a part of the first step portion is located on the opposite side of the head actuator with respect to a line which connects an outer end portion of the first step portion and a center of rotation of the recording medium.

14 Claims, 9 Drawing Sheets

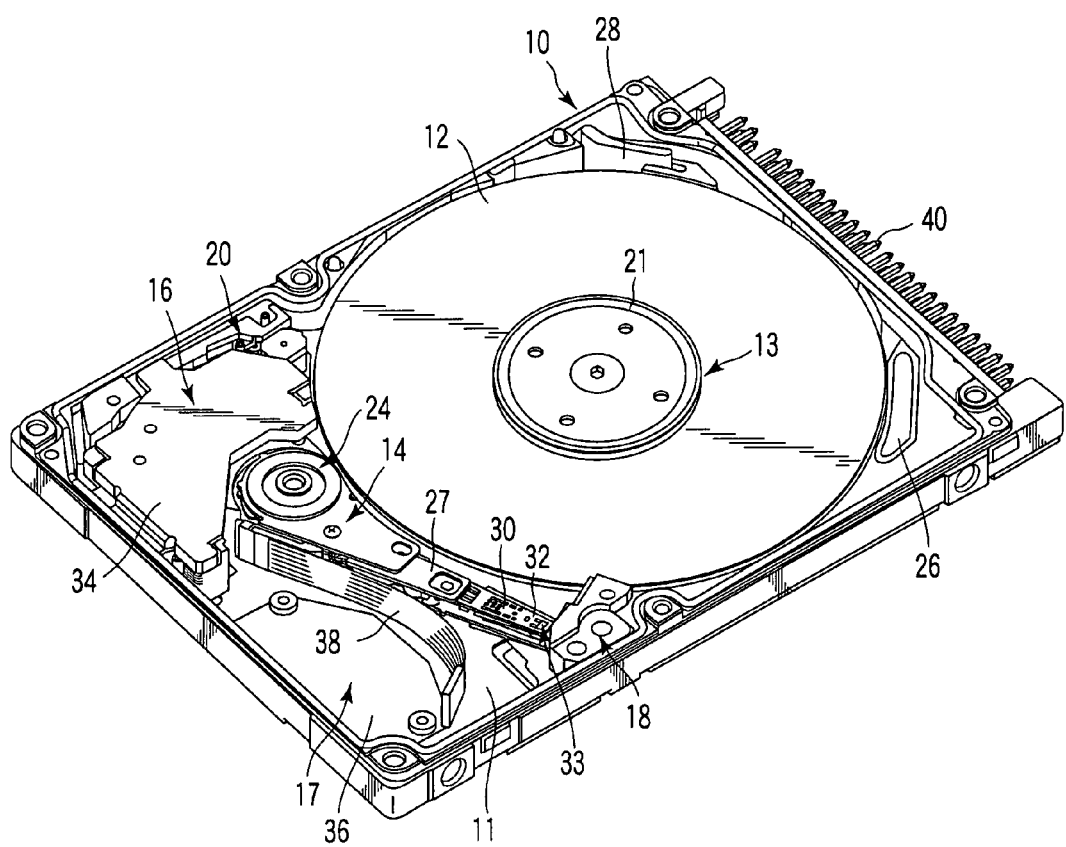
F I G. 1

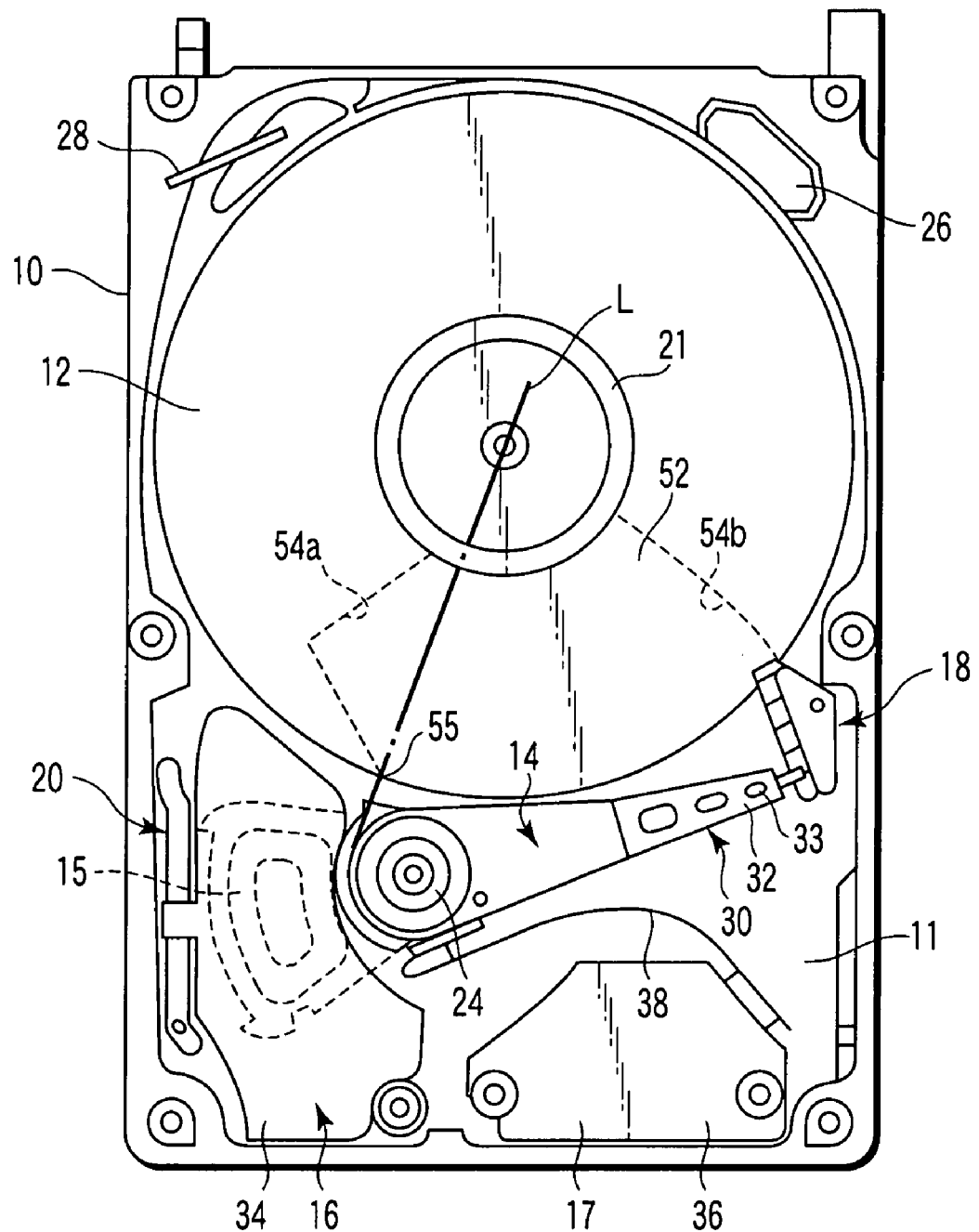
F I G. 13

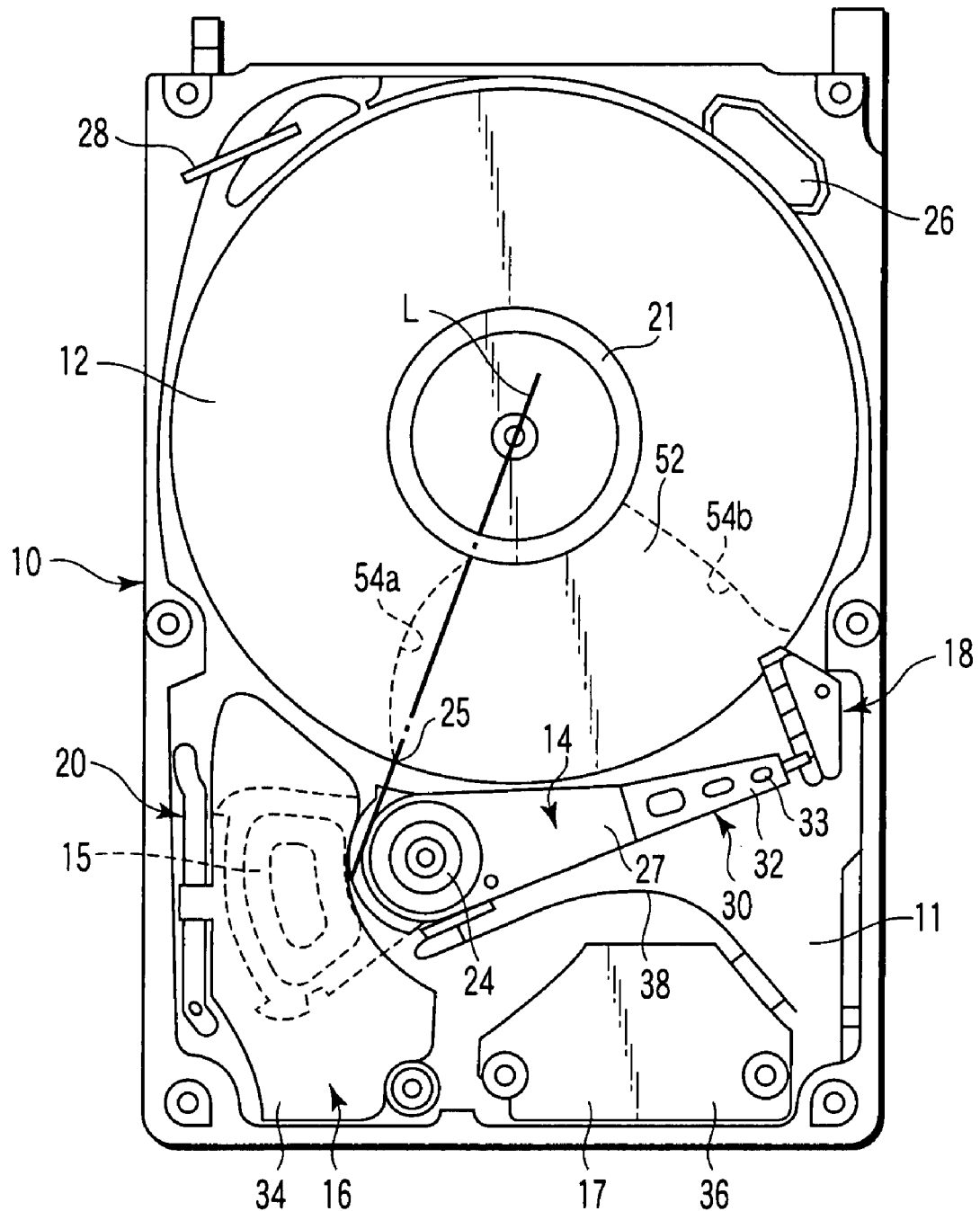
F I G. 14

DISK DEVICE

CROSS-REFERENCE TO RELATED APPLICATIONS

This application is based upon and claims the benefit of priority from Japanese Patent Application No. 2006-274282, filed Oct. 5, 2006, the entire contents of which are incorporated herein by reference.

BACKGROUND

1. Field

One embodiment of the invention relates to a disk device provided with a disk shaped recording medium.

2. Description of the Related Art

In recent years, disk devices, such as magnetic disk devices, optical disk devices, etc., have been widely used as external recording devices of computers or image or music recording/reproducing apparatuses.

A disk device, e.g., a magnetic disk device, generally includes a base in the form of an open-topped rectangular box and a top cover that is fastened to the base by screws so as to close the top opening of the base. The base contains a magnetic disk, spindle motor, magnetic heads, head actuator, voice coil motor, board unit, etc. The spindle motor supports and rotates the magnetic disk for use as a recording medium. The heads serve to write and read information to and from the disk. The head actuator supports the heads for movement with respect to the disk. The voice coil motor serves to rock and position the actuator. The board unit includes a head IC and the like.

A printed circuit board (PCB) for controlling the operations of the spindle motor, voice coil motor, and magnetic heads through the board unit is screwed to the outer surface of the bottom wall of the base. Various semiconductor devices, a shock sensor, interface connectors, etc., are mounted on the PCB.

With the development of smaller or thinner magnetic disk devices, bases have been made thinner and thinner. According to a device described in Jpn. Pat. Appln. KOKAI Publication No. 2001-126445, for example, that region of a bottom wall of a base which faces a magnetic disk is formed as a circular protrusion that projects toward the disk, in order to prevent generation of a turbulence by the rotation of the disk. The protrusion faces a surface of the disk with a narrow gap therebetween. In this case, the reverse side of the bottom wall of the base is recessed to form an accommodation section that can accommodate the electronic components on the PCB. Further, a recess is formed in that region of the protrusion on the bottom wall of the base which corresponds to the range of movement of the head actuator. Thus, a movable space for the head actuator is secured by the recess.

In the magnetic disk device described above, the recess in the bottom wall of the base is substantially in the shape of a fan corresponding to the movement range of the head actuator. The circumferentially opposite end portions of the recess are defined by a pair of step portions that extend substantially radially from the central part of the magnetic disk. That one of the paired step portions which is situated on the upstream side with respect to the direction of rotation of the disk is formed along a position of the head actuator reached when the actuator is moved to the innermost periphery of the disk. Thus, this step portion is provided on the head actuator side with respect to a straight line that passes through its radially outer end and the center of the disk.

If a severe shock acts on the above-described magnetic disk device when it is not operating, the magnetic disk first bends so that its outer peripheral edge touches the peripheral edge portion the bottom wall of the base. Since the range for the movement of the head actuator is defined by the recess, that part of the disk which faces the recess is further deformed toward the bottom of the recess. If the step portion that defines the recess is situated on the actuator side in the aforesaid manner, a data recording region of the deformed disk may touch the step portion in some cases. If this contact occurs, the data recording region of the disk may be damaged so that information recorded therein is lost.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 1 is an exemplary perspective view showing an HDD according to a first embodiment of the invention;

FIG. 13 is an exemplary plan view showing an HDD according to a third embodiment of the invention;

FIG. 14 is an exemplary plan view showing an HDD according to a fourth embodiment of the invention;

DETAILED DESCRIPTION

Various embodiments according to the invention will be described hereinafter with reference to the accompanying drawings. In general, according to one embodiment of the invention, there is provided a disk device according to an aspect of the present invention comprises a base including a bottom wall; a motor provided on the base; a disk-shaped recording medium rotatably supported on the motor and opposed to the bottom wall of the base; a head which performs information processing for the recording medium; and a head actuator which is rotatably mounted on the base and supports the head for movement with respect to the recording medium, the bottom wall of the base including a recess provided opposite a movement region for the head actuator and a first step portion and a second step portion which individually extend from the vicinities of the motor to the vicinities of an outer peripheral edge of the recording medium and define the recess, at least a part of the first step portion on the side of a center of rotation of the head actuator being located on the opposite side of the head actuator with respect to a line which connects an outer end portion of the first step portion on the outer peripheral edge side of the recording medium and a center of rotation of the recording medium.

A first embodiment in which this invention is applied to a hard disk drive (hereinafter, referred to as HDD) as a disk device will now be described in detail with reference to the accompanying drawings.

Figure 2:
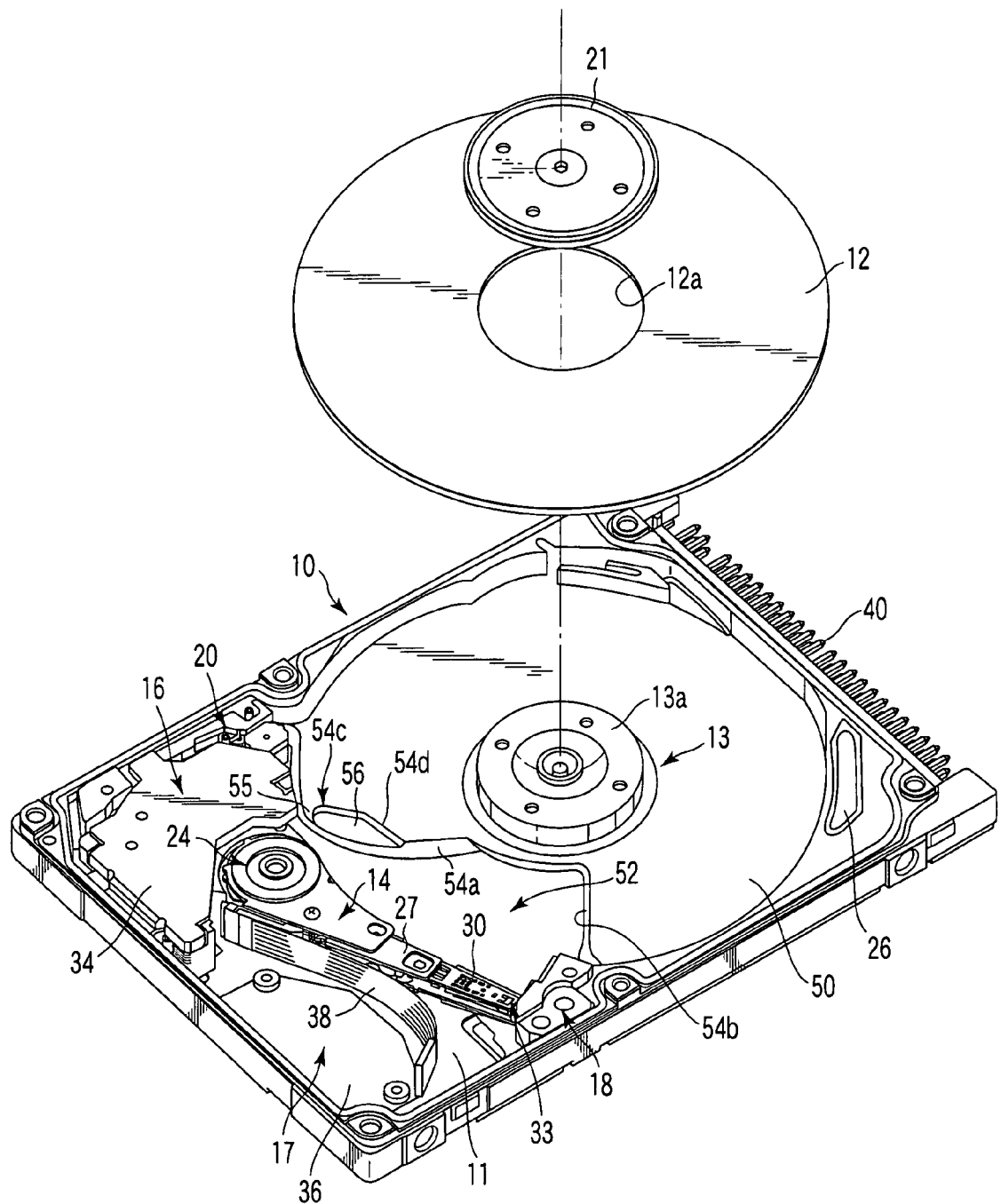
FIG. 2 is an exemplary exploded perspective view showing the HDD.

As shown in FIGS. 1 and 2, the HDD includes a base 10 in the form of an open-topped rectangular box and a top cover (not shown), which is fastened to the base by screws so as to close a top opening of the base.

The base 10 contains a magnetic disk 14, spindle motor 13, magnetic heads, head actuator 14, and voice coil motor (VCM) 16. The spindle motor 13 supports and rotates the magnetic disk for use as a recording medium. The heads serve to record and reproduce information to and from the disk. The head actuator 14 supports the heads for movement with respect to the disk 12. The VCM 16 serves to rock and position the actuator. The base 10 further contains a ramp load mechanism 18, an inertia latch mechanism 20, and a flexible printed circuit board (FPC) unit 17. The ramp load mechanism 18 holds the magnetic heads in a position at a distance from the magnetic disk 12 when the heads are moved to the outermost periphery of the disk. The inertia latch mechanism 20 serves to hold the head actuator 14 in a retracted position. Circuit components, including a preamplifier and the like, are mounted on the FPC unit 17. The base 10 has a rectangular bottom wall 11. The spindle motor 13, head actuator 14, VCM 16, etc., are disposed on the inner surface of the bottom wall 11.

As shown in FIG. 2, the spindle motor 13 has a stator (not shown) fixed to the central part of the base 10 and a columnar hub 13a, which serves as a rotor rotatable with respect to the stator.

The magnetic disk 12 is formed having a diameter of, for example, 65 mm (2.5 inches) and provided with a bore 12a. The disk 12 includes a base substrate formed of, for example, glass or aluminum and magnetic recording layers formed individually on the upper and lower surfaces of the base substrate. The recording layers form a data recording region that covers the whole area of the magnetic disk 12 except its outer and inner peripheral edge portions.

The magnetic disk 12 is coaxially fitted on a hub 13a of the spindle motor 13 and clamped by a clamp spring 21. Thus, the disk 12 is fixed on the outer periphery of the hub 13a and supported for rotation integral with the hub. The disk 12 is rotated at a predetermined speed by the spindle motor 13 for use as a drive unit.

Figure 3:
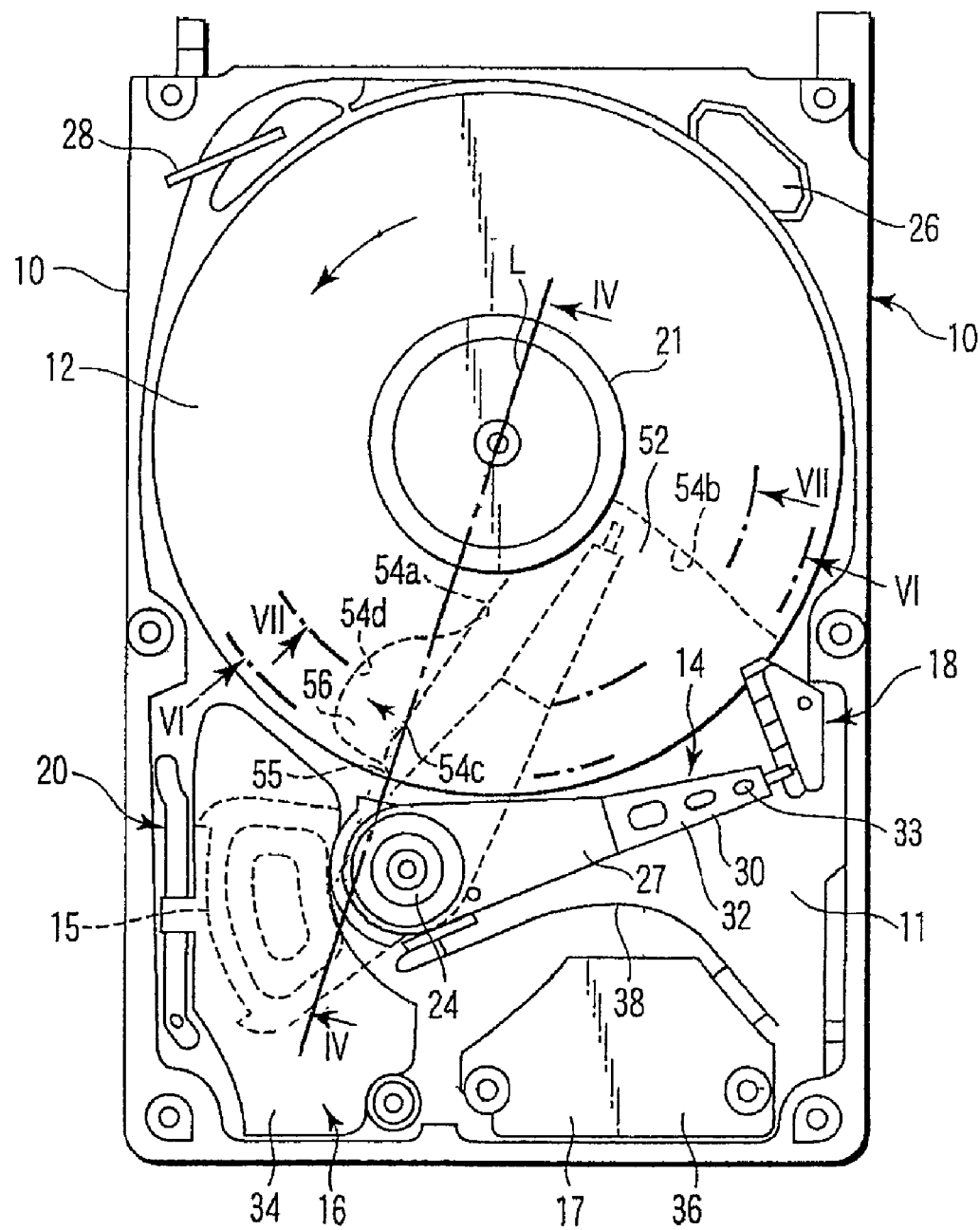
FIG. 3 is an exemplary plan view showing the HDD.

As shown in FIGS. 1 to 3, the head actuator 14 is provided with a bearing assembly 24 fixed on the bottom wall of the base 10, two arms 27 supported on the bearing assembly, and magnetic head assemblies 30 supported on the arms, individually. Each magnetic head assembly 30 includes an elongate suspension 32 formed of a leaf spring and a magnetic head 33 fixed to an extended end of the suspension.

The VCM 16 includes a voice coil 15 attached to the head actuator 14, a yoke 34 fixed on the bottom wall 11 and opposed to the voice coil, and a magnet (not shown) fixed to the yoke.

The FPC unit 17 has a board body 36 fixed on the bottom wall 11 of the base 10. Electronic components, connectors, etc., are mounted on the board body. The FPC unit 17 includes a belt-shaped main flexible printed circuit board 38, which electrically connects the board body 36 and the head actuator 14. Each magnetic head 33 that is supported by the actuator 14 is electrically connected to the FPC unit 17 through the printed circuit board 38. A breathing filter 26 and a circulation filter 28 are arranged around the base 10 beside the magnetic disk 12.

A printed circuit board (not shown) for controlling the operations of the spindle motor 13, VCM 16, and magnetic heads through the FPC unit 17 is screwed to the outer surface of the bottom wall 11 of the base 10 so as to face the bottom wall 11. A large number of electronic components including connectors 40 are mounted on this printed circuit board. The printed circuit board is located so that its surface on which the electronic components are mounted faces the outer surface of the bottom wall 11.

Figure 4:
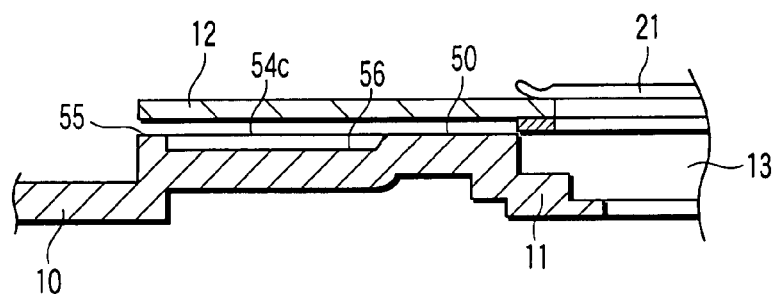
FIG. 4 is an exemplary sectional view of the HDD taken along line IV-IV of FIG. 3.

As shown in FIGS. 2 to 4, that region of the bottom wall 11 of the base 10 which faces the magnetic disk 12 is formed as a circular protrusion 50 that projects toward the disk. The protrusion 50 faces a surface of the disk with a narrow gap therebetween. The outside diameter of the protrusion 50 is a little larger than that of the magnetic disk 12. If the protrusion 50 is formed in this manner, the reverse side of the bottom wall 11 of the base 10 is recessed to form a storage section that can store the electronic components on the aforesaid printed circuit board.

A recess 52 is formed in that region of the protrusion 50 on the bottom wall 11 of the base 10 which corresponds to the range of movement of the head actuator 14, that is, the ranges of movement of the arms 27 and the magnetic head assemblies 30. Thus, a movable space for the head actuator is secured by the recess 52. The recess 52 is substantially in the shape of a fan corresponding to the movement range of the head actuator 14. The circumferentially opposite end portions of the recess 52 are defined by a first step portion 54a and a second step portion 54b. The first and second step portions 54a and 54b extend substantially radially from the central part of the magnetic disk 12, i.e., the spindle motor 13 in this case, to the outer peripheral edge of the protrusion 50.

The first step portion 54a is disposed on the side of the bearing assembly 24, i.e., the center of rocking motion of the head actuator 14, and is situated on the upstream side with respect to the direction of rotation of the magnetic disk 12. The second step portion 54b is situated on the side of the ramp load mechanism 18 on the downstream side with respect to the direction of rotation of the disk 12. It is formed along a path of movement of the distal end of the suspension 32.

The first step portion 54a includes an outer end portion 55, which is situated on the outer peripheral edge of the protrusion 50 and faces the outer peripheral edge of the magnetic disk 12. At least a part of the first step portion 54a is located on the opposite side of the head actuator 14 with respect to a line L that connects the outer end portion 55 and the center of rotation of the disk 12.

Figure 7:
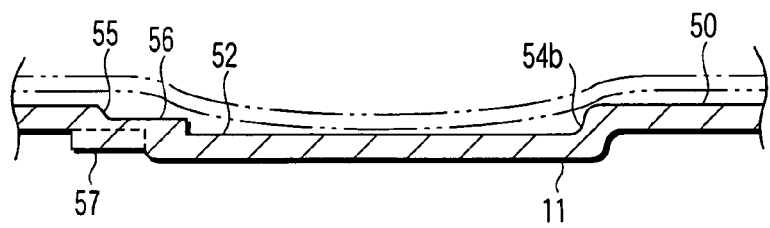
FIG. 7 is an exemplary sectional view of the HDD taken along line VII-VII of FIG. 3.

In the present embodiment, the first step portion 54a includes an outer peripheral portion 54c that extends to the outer end portion 55 from a halfway portion of the first step portion 54a between the outer end portion 55 and an end near the spindle motor 13. The outer peripheral portion 54c is located on the opposite side of the head actuator 14 with respect to the line L that connects the outer end portion 55 and the center of rotation of the magnetic disk 12. As shown in FIGS. 2, 3 and 7, the outer peripheral portion 54c of the first step portion 54a includes an upper step portion 54d and a middle step portion 56. The upper step portion 54d, which is flush with the protrusion 50, is defined by the outer peripheral portion 54c. The middle step portion 56 is formed lower than the upper step portion 54d and higher than the bottom of the recess 52 and has a height about half that of the protrusion 50, for example. The upper step portion 54d is located on the opposite side of the head actuator 14 with respect to the line L that connects the outer end portion 55 of the first step portion 54a and the center of rotation of the magnetic disk 12.

As shown in FIG. 7, a projection 57 is formed on the reverse side of the bottom wall 11, corresponding to the middle step portion 56 of the first step portion 54a. Despite the presence of the middle step portion 56, therefore, the base 10 can be molded easily and securely without rendering any part of the bottom wall 11 very thin. Although the first step portion 54a is formed of the two step portions, upper and middle, it may alternatively be formed of three or more step portions.

Figure 5:
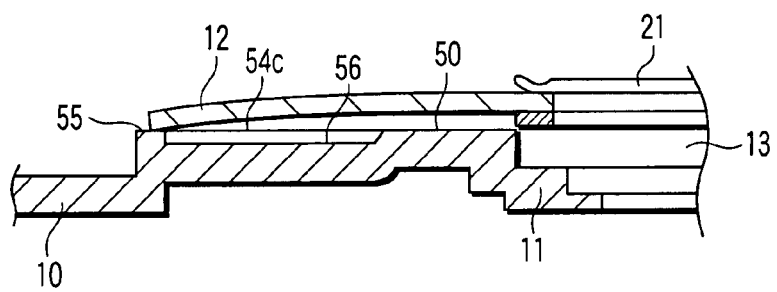
FIG. 5 is an exemplary sectional view corresponding to FIG. 4, showing a state in which a magnetic disk is deformed.

If a severe shock acts on the HDD constructed in this manner when it is not operating, the outer peripheral portion of the magnetic disk 12 is deformed. In this case, as shown in FIG. 5, the outer peripheral edge of the disk 12 first touches the outer peripheral edge portion of the protrusion 50 on the bottom wall 11 and the outer end portion 55 of the first step portion 54a. Since the outer peripheral edge of the disk 12 is not provided with any data recording region, its contact with the bottom wall 11 causes no problem of data loss.

Figure 6:
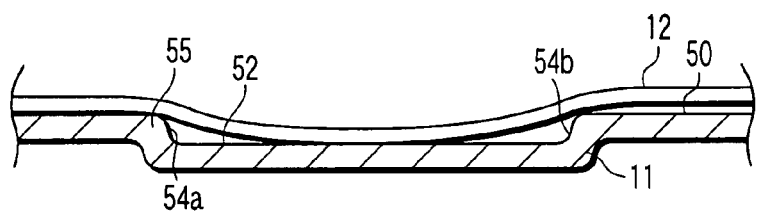
FIG. 6 is an exemplary sectional view of the HDD taken along line VI-VI of FIG. 3.

In the protrusion 50, the recess 52 defines a range for the movement of the head actuator 14. As shown in FIG. 6, therefore, that part of the magnetic disk 12 which faces the recess 52 is further three-dimensionally deformed toward the bottom of the recess. As this is done, the data recording region of the disk 12 is deformed to the side of the recess 52 with respect to the line L that connects the outer end portion 55 of the first step portion 54a and the center of rotation of the disk 12. The first step portion 54a that defines the recess 52 includes the outer peripheral portion 54c that is situated on the opposite side of the head actuator 14 with respect to the line L, the upper step portion 54d, and the middle step portion 56 that is one step lower than the upper step portion 54d. Thus, if the data recording region of the magnetic disk 12 is deformed, as shown in FIG. 7, it can never touch the first step portion 54a or any other parts of the bottom wall 11.

On the side of the second step portion 54b, moreover, the outer peripheral edge portion of the magnetic disk 12 is situated between ramps of the ramp load mechanism 18. If the disk 12 is deformed by any shock, therefore, its outer peripheral edge portion engages the ramps, so that it is restrained from being heavily deformed toward the base 10. Thus, contact between the data recording region of the magnetic disk and the bottom wall of the base can be also prevented on the side of the second step portion 54b.

Even if the magnetic disk is deformed by a severe shock, therefore, contact between the base and the data recording region of the disk resulting in a loss of information can be prevented, so that a disk device with improved reliability can be obtained.

The following is a description of an HDD according to a second embodiment of the invention.

Figure 8:
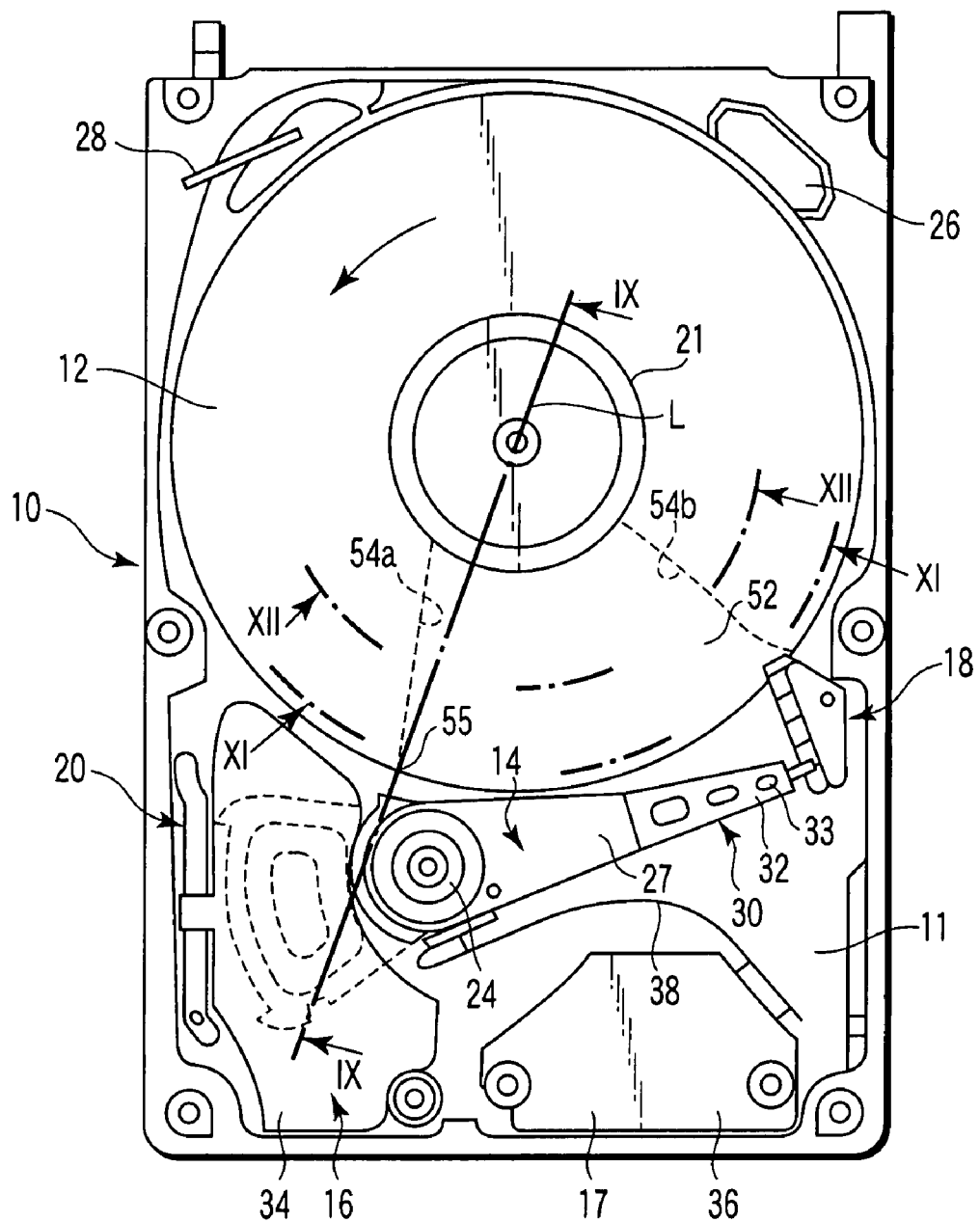
FIG. 8 is an exemplary plan view showing an HDD according to a second embodiment of the invention.
Figure 9:
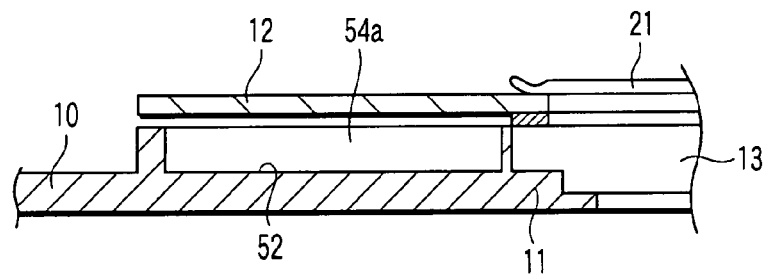
FIG. 9 is an exemplary sectional view of the HDD taken along line IX-IX of FIG. 8.

According to the second embodiment, as shown in FIGS. 8 and 9, a first step portion 54a that defines a recess 52 in a bottom wall 11 of a base 10 extends straight from its outer end portion 55 to the vicinity of a spindle motor 13. Further, the entire first step portion 54a is located on the opposite side of a head actuator 14 with respect to a line L that connects the outer end portion 55 and the center of rotation of a magnetic disk 12.

Since other configurations of the HDD of the second embodiment are the same as those of the foregoing first embodiment, like reference numbers are used to designate like portions, and a detailed description of those portions is omitted.

Figure 10:
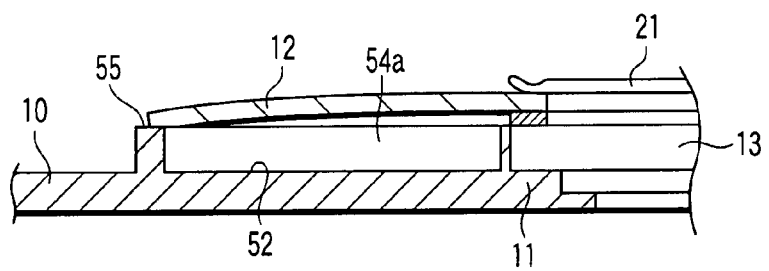
FIG. 10 is an exemplary sectional view corresponding to FIG. 9, showing a state in which a magnetic disk is deformed.
Figure 11:
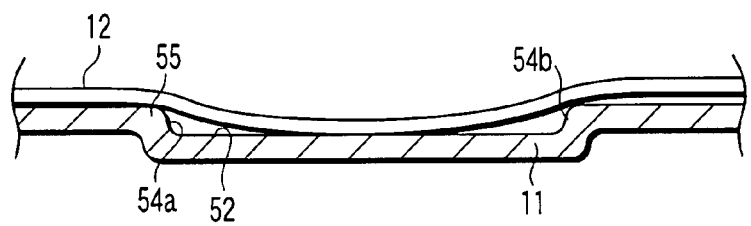
FIG. 11 is an exemplary sectional view of the HDD taken along line XI-XI of FIG. 8.
Figure 12:
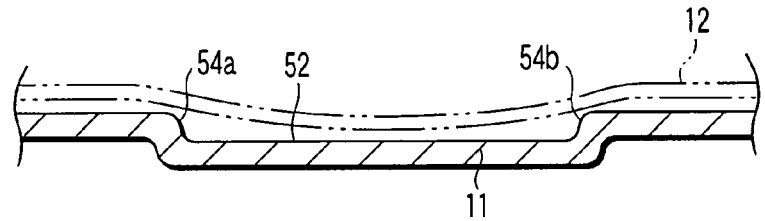
FIG. 12 is an exemplary sectional view of the HDD taken along line XII-XII of FIG. 8.

If a severe shock acts on the HDD constructed in this manner when it is not operating, the outer peripheral portion of the magnetic disk 12 is deformed. In this case, as shown in FIG. 10, the outer peripheral edge of the disk 12 first touches the outer peripheral edge portion of a protrusion 50 on the bottom wall 11 and the outer end portion 55 of the first step portion 54a. As shown in FIG. 11, that part of the magnetic disk 12 which faces the recess 52 is further three-dimensionally deformed toward the bottom of the recess. As this occurs, a data recording region of the disk 12 is deformed to the side of the recess 52 with respect to the line L that connects the outer end portion 55 of the first step portion 54a and the center of rotation of the disk 12. The first step portion 54a that defines the recess 52 is situated on the opposite side of the head actuator 14 with respect to the line L. Thus, if the data recording region of the magnetic disk 12 is deformed, as shown in FIG. 12, it can never touch the first step portion 54a or any other parts of the bottom wall 11.

Thus, even if the magnetic disk is deformed by a severe shock, according to the second embodiment, contact between the base and the data recording region of the disk resulting in a loss of information can be prevented, so that a disk device with improved reliability can be obtained.

The shape of the first step portion 54a that defines the recess 52 is not limited to a straight shape but may be a bent or curved shape that combines a plurality of straight lines. Alternatively, the first step portion 54a may be formed by combining a plurality of step portions that are different in height.

In an HDD according to a third embodiment of the invention, as shown in FIG. 13, a first step portion 54a that defines a recess 52 in a bottom wall 11 of a base 10 is formed by combining a plurality of straight lines and extends in a bent shape from its outer end portion 55 to the vicinity of a spindle motor 13. Further, the entire first step portion 54a is located on the opposite side of a head actuator 14 with respect to a line L that connects the outer end portion 55 and the center of rotation of a magnetic disk 12.

In an HDD according to a fourth embodiment of the invention, as shown in FIG. 14, a first step portion 54a that defines a recess 52 in a bottom wall 11 of a base 10 extends in a curved shape from its outer end portion 55 to the vicinity of a spindle motor 13. Further, the entire first step portion 54a is located on the opposite side of a head actuator 14 with respect to a line L that connects the outer end portion 55 and the center of rotation of a magnetic disk 12.

Figure 15:
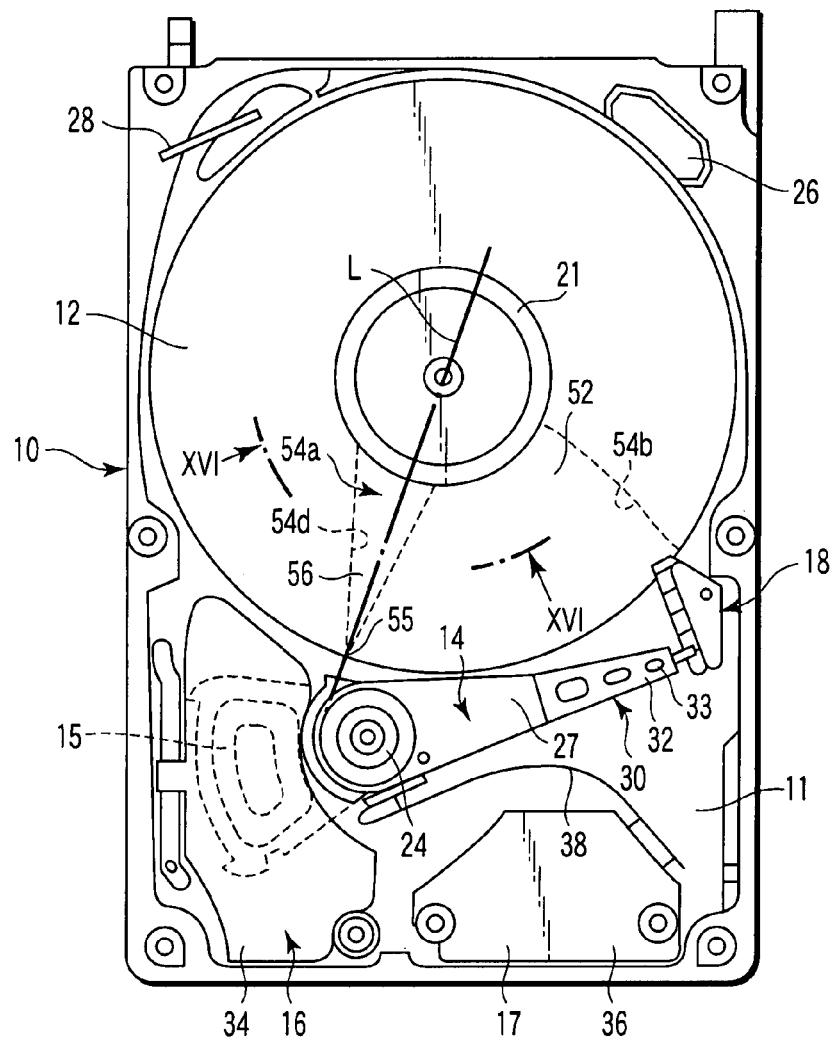
FIG. 15 is an exemplary plan view showing an HDD according to a fifth embodiment of the invention.
Figure 16:
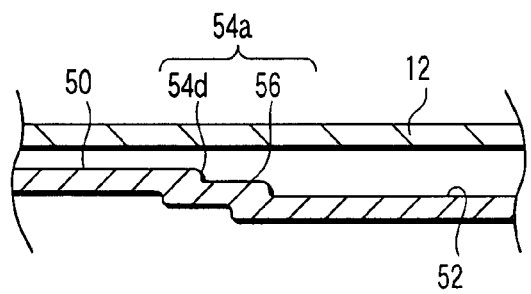
FIG. 16 is an exemplary sectional view of the HDD taken along line XVI-XVI of FIG. 15.

In an HDD according to a fifth embodiment of the invention, as shown in FIGS. 15 and 16, a first step portion 54a that defines a recess 52 in a bottom wall 11 of a base 10 extends straight from its outer end portion 55 to the vicinity of a spindle motor 13. The first step portion 54a includes a straight upper step portion 54d and a straight middle step portion 56 that is lower than the upper step portion. At least a part of the first step portion 54a, e.g., the entire first step portion in this case, is located on the opposite side of a head actuator 14 with respect to a line L that connects the outer end portion 55 and the center of rotation of a magnetic disk 12.

Since other configurations of the HDDs of the third, fourth, and fifth embodiments are the same as those of the foregoing first embodiment, like reference numbers are used to designate like portions, and a detailed description of those portions is omitted. The same functions and effects of the first embodiment can be also obtained from the third, fourth, and fifth embodiments. With use of the middle step portion, according to the fifth embodiment, thin-walled portions of the bottom wall of the base can be reduced in area, so that the stiffness of the base can be enhanced.

In the third, fourth, and fifth embodiments, the first step portion 54*a* or the entire upper step portion is located on the opposite side of the head actuator 14 with respect to the line L that connects the outer end portion 55 and the center of rotation of the magnetic disk 12. Alternatively, however, contact between the disk and the base can be prevented by locating the first step portion 54*a* or at least a part of the upper step portion, or preferably, that part which faces the outer peripheral side of the disk, on the opposite side of the head actuator 14 with respect to the line L.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

For example, the magnetic disk used in each HDD is not limited to one in number, but two or more magnetic disks may be used as required. The application of this invention is not limited to magnetic disk devices, but the invention is also applicable to any other disk devices, such as optical disk devices.

What is claimed is:

1. A disk device comprising:
a base including a bottom wall;
a motor provided on the base;
a disk-shaped recording medium rotatably supported on the motor and opposed to the bottom wall of the base;
a head which performs information processing for the recording medium; and
a head actuator which is rotatably mounted on the base and supports the head for movement with respect to the recording medium,
the bottom wall of the base including a recess provided opposite a movement region for the head actuator and a first step portion and a second step portion which individually extend from the vicinities of the motor to the vicinities of an outer peripheral edge of the recording medium and define the recess,
wherein the first step portion on the side of a center of rotation of the head actuator comprises an outer end that faces the outer peripheral edge of the recording medium and an outer peripheral portion that extends from the outer end toward an end near the motor, and
wherein the outer peripheral portion is located on the opposite side of the head actuator with respect to a line which connects the outer end of the first step portion and a center of rotation of the recording medium.

2. The disk device according to claim 1, wherein the first step portion extends straight from the outer end to the vicinity of the motor.

3. The disk device according to claim 2, wherein the entire first step portion is located on the opposite side of the head actuator with respect to the line which connects the outer end of the first step portion and the center of rotation of the recording medium.

4. The disk device according to claim 1, wherein the first step portion extends in a line which combines a plurality of straight lines from the outer end to the vicinity of the motor.

5. The disk device according to claim 1, wherein the first step extends in a curve from the outer end portion to the vicinity of the motor.

6. The disk device according to claim 1, wherein the first step portion includes an upper step portion and a middle step portion lower than the upper step portion, the upper step portion being located on the opposite side of the head actuator with respect to the line which connects the outer end portion of the first step portion and the center of rotation of the recording medium.

7. The disk device according to claim 1, wherein the outer peripheral portion of the first step portion includes an upper step portion and a middle step portion lower than the upper step portion, the upper step portion being located on the opposite side of the head actuator with respect to the line which connects the outer end of the first step portion and the center of rotation of the recording medium.

8. The disk device according to claim 1, wherein the outer peripheral portion of the first step portion extends from the outer end to a location which is distant from the peripheral edge of the disk to the center of the disk by a half of a radius of a recording region of the disk.

9. The disk device according to claim 8, wherein the first step portion extends straight from the outer end to the vicinity of the motor.

10. The disk device according to claim 9, wherein the entire first step portion is located on the opposite side of the head actuator with respect to the line which connects the outer end of the first step portion and the center of rotation of the recording medium.

11. The disk device according to claim 8, wherein the first step portion extends in a line which combines a plurality of straight lines from the outer end to the vicinity of the motor.

12. The disk device according to claim 8, wherein the first step portion extends in a curve from the outer end to the vicinity of the motor.

13. The disk device according to claim 8, wherein the first step portion includes an upper step portion and a middle step portion lower than the upper step portion, the upper step portion being located on the opposite side of the head actuator with respect to the line which connects the outer end portion of the first step portion and the center of rotation of the recording medium.

14. The disk device according to claim 8, wherein the outer peripheral portion of the first step portion includes an upper step portion and a middle step portion lower than the upper step portion, the upper step portion being located on the opposite side of the head actuator with respect to the line which connects the outer end of the first step portion and the center of rotation of the recording medium.

* * * * *